H. R. DULANY.
LEVEL INDICATOR FOR AIRPLANES.
APPLICATION FILED JUNE 26, 1919.
1,410,661.
Patented Mar. 28, 1922.
2 SHEETS—SHEET 1.
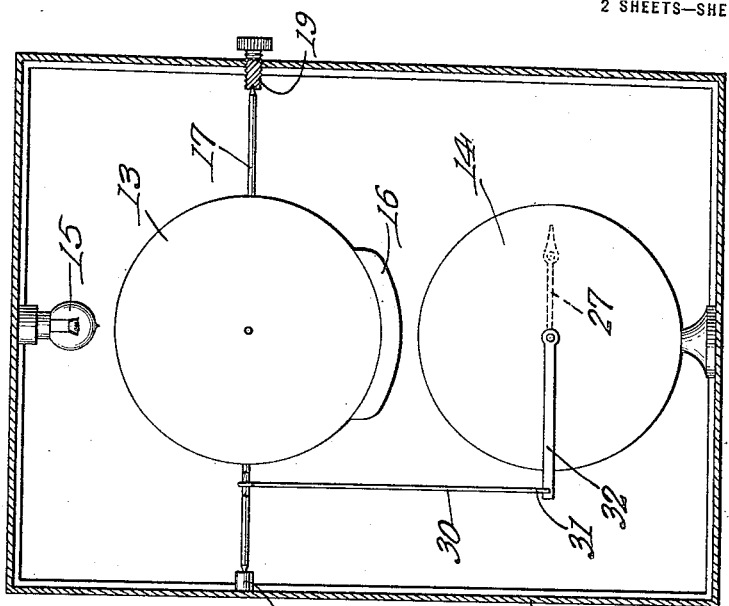
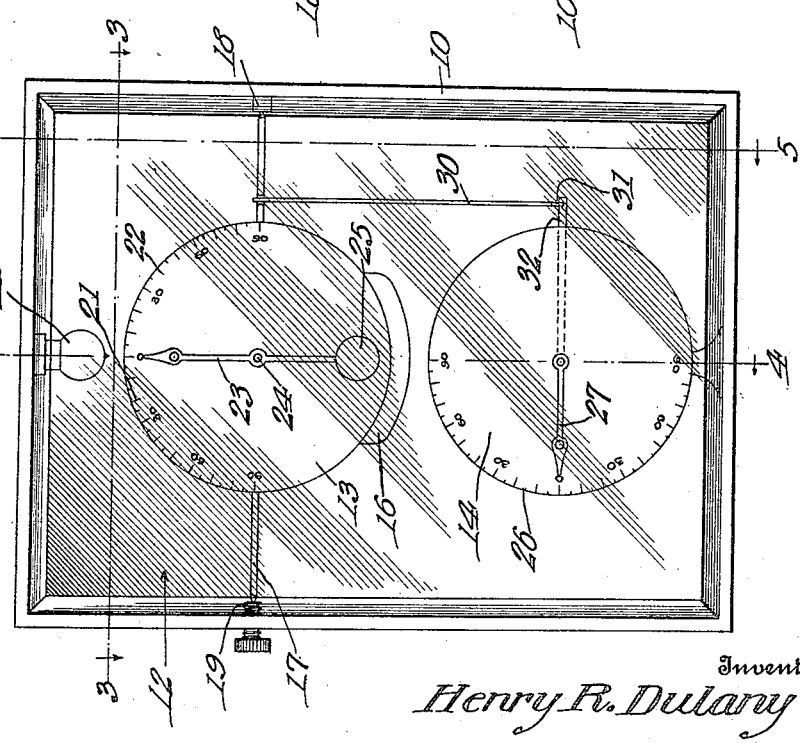
Witness
Ed. R. Lusby
Inventor
Henry R. Dulany
By Davis Felton Moore
Attorney H. R. DULANY.
LEVEL INDICATOR FOR AIRPLANES.
APPLICATION FILED JUNE 26, 1919.
1,410,661.
Patented Mar. 28, 1922.
2 SHEETS—SHEET 2.
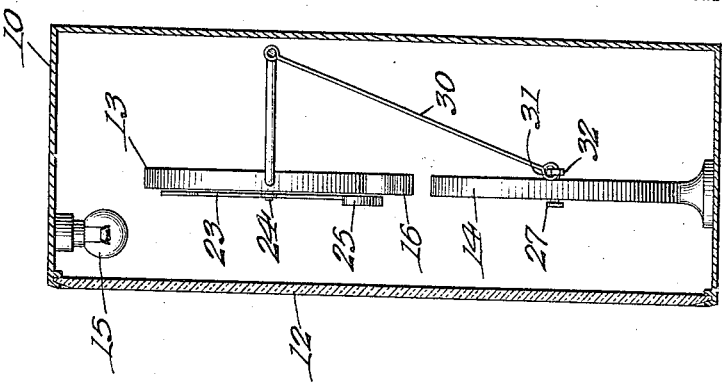
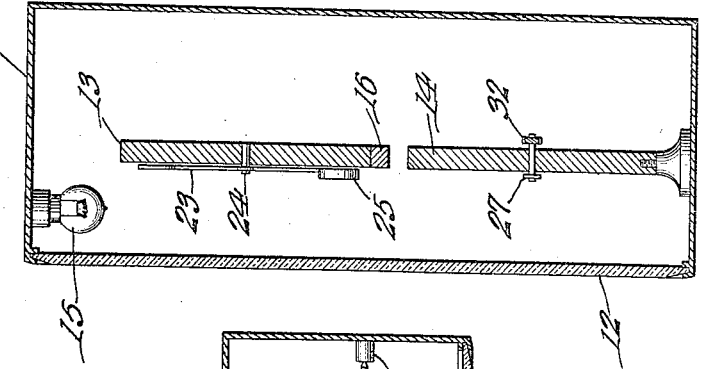
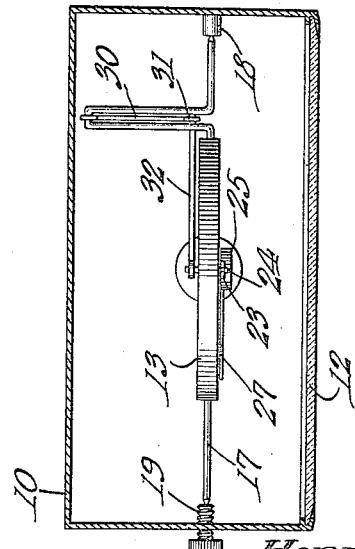
Inventor
Henry R. Dulany
Witness
Ed. R. Lusby
By David Peller Moore
Attorney

UNITED STATES PATENT OFFICE.

HENRY ROZIER DULANY, OF UPPERVILLE, VIRGINIA.

LEVEL INDICATOR FOR AIRPLANES.

1,410,661.  Specification of Letters Patent.  Patented Mar. 28, 1922.

Application filed June 26, 1919. Serial No. 306,885.

*To all whom it may concern:*

Be it known that I, HENRY ROZIER DULANY, a citizen of the United States, residing at Upperville, in the county of Fauquier and State of Virginia, have invented certain new and useful Improvements in Level Indicators for Airplanes, of which the following is a specification, reference being had therein to the accompanying drawing.

This invention relates to improvements in level indicators for airplanes, one object of the invention being the production of an indicator which will at all times present to the pilot or aviator an indication as to whether the machine is on an even keel or at what angle it is off keel.

A further object of this invention is the provision of an indicator of this type which will be unaffected by the vibrations of the motor and machine or the air currents produced thereby and which at all times will give a visual indication of the angle of inclination either transversely or longitudinally of the fuselage, thus producing a means whereby the pilot or aviator will know his position in the air and permit him to at all times control the machine and maintain its equilibrium.

A still further object of this invention is the provision of a level indicator which is simple, inexpensive and durable in construction, which is thoroughly efficient and practical in use and which can be readily attached to the instrument board of an airplane and is a complete instrument per se.

In the accompanying drawings:

Figure 1 is a front elevation of the complete instrument.

Figure 2 is a rear elevation of the same with the rear wall of the casing removed.

Figure 3 is a section taken on line 3—3 of Figure 1.

Figure 4 is a section taken on line 4—4 of Figure 1.

Figure 5 is a section taken on line 5—5 of Figure 1.

Referring to the drawings, the numeral 10 designates a casing having the rear wall 11, such casing having the front transparent wall 12 by means of which the transverse level dial 13 and the longitudinal level dial 14 may be observable at all times.

There is also mounted in the casing an electric lamp 15 which is so disposed as to render the faces of the respective dials observable at all times especially during the night or during heavy fog.

The dial 13 has the lower weighted end 16 and is secured upon the shaft 17 which is adjustably mounted on the respective bearings 18 and 19 so as to have the necessary swinging movement to oscillate the arm 20, the purpose of which will presently appear. The dial 13 is provided with the 90° indications 21 on the left side of the dial and with similar indications 22 upon the right side thereof so that the pointer 23 mounted upon the axis 24 and normally held at zero by the weight 25 will indicate at all times whether the machine is level or whether it is inclined longitudinally or transversely.

As above stated, the dial 14 is a longitudinal level indicator and is a fixed dial, it being attached to the base of the casing and provided with the indications 26 which through the pointer 27 will indicate the longitudinal angulation of the machine due to the climbing or coasting movement thereof, as the dial 13 will swing and through the shaft 17, the arm 20, the rod 30, and the arm 32, will actuate the pointer 27.

It is possible to dispense with the indicator 14 and simply use the indicator 13 which will exhibit to the pilot the horizontal inclination of the machine when in flight and if so desired two of these may be so employed, one in front so that the pointer 23 will rock transversely of the machine and another on the side so the same will rock horizontally.

From the foregoing description taken in connection with the drawings, it is evident that with an instrument constructed according to and embodying the present invention it would be impossible for a pilot or aviator to become lost due to the loss of sense of the horizontal as the indicator regardless of the condition of the dial would indicate at all times the position of the body or fuselage of the machine.

What I claim as new is:

1. A level indicator for airplanes including a support, a weighted pivoted dial mounted therein and adapted to occupy a vertical plane and having a shaft secured thereto, a fixed indicator disposed below said dial, a pointer carried by the fixed indicator and operably connected to said shaft whereby the swinging movement of the dial is imparted to the pointer of the fixed indicator, and a pivoted weighted pointer carried by the dial.

2. A level indicator for airplanes including a support, a weighted pivoted dial mounted therein and adapted to occupy a vertical plane and having a shaft secured thereto, a pivoted weighted pointer bodily carried by said dial, a fixed dial below the first dial, a pivoted pointer carried thereby, and means for operably connecting the said pointer to the shaft of the first dial whereby said pointer is operated thereby.

3. A level indicator for airplanes including a casing, a dial journalled therein, and weighted so as to occupy a vertical position, a weighted pointer mounted to swing in a plane parallel to said dial and cooperating with said dial, a dial fixed in the casing, a pointer carried thereby, and adapted to swing in a plane parallel to said fixed dial, an arm connected to the second mentioned pointer, a rod connected to said arm, and co-operating means carried by the weighted dial and said rod whereby said rod is reciprocated due to the swinging movement of the first dial.

4. A level indicator for airplanes including a casing, a shaft mounted transversely thereof for swinging movement, a weighted dial attached to and movable with said shaft, said dial being provided with graduations, a weighted pointer carried bodily by said dial and mounted to swing in a plane parallel to said dial, a second dial fixedly mounted in the casing, a second swinging pointer carried by the fixed dial, and means operably connecting said last pointer to the shaft whereby the oscillation of the shaft oscillates said pointer.

In testimony whereof I affix my signature.

HENRY ROZIER DULANY.